UNITED STATES PATENT OFFICE.

HERMANN NORDTMEYER, OF CELLE, GERMANY.

FILTERING MATERIAL.

SPECIFICATION forming part of Letters Patent No. 665,925, dated January 15, 1901.

Application filed July 18, 1900. Serial No. 24,041. (No specimens.)

*To all whom it may concern:*

Be it known that I, HERMANN NORDTMEYER, manufacturer, a subject of the Emperor of Germany, residing at Celle, Province of Hanover, German Empire, have invented certain new and useful Improvements in Filtering Masses, of which the following is a specification.

This invention relates to filtering materials, and aims to provide an improved filtering material.

To this end my invention provides a burned mass consisting, essentially, of kieselguhr or infusorial earth and asbestos or similar material and which is preferably intended for filtering drinking-water or other liquids that are required to be made as free as possible of germs.

It is well known that burned masses of kieselguhr and organic or inorganic substances have already been made, chiefly used for highly-fireproof insulating-bricks or also for the absorption of liquids. For the purpose of filtration it is of the greatest importance that such masses present special physical properties—viz., the largest possible number of uniformly-fine pores, so that the smallest solid substances, even bacteria, shall be retained, wherefore it is very essential that the volume of the pores be so great that the maximum of quantitative capacity combined with the greatest qualitative efficiency shall be obtained and that the mass be free of any cracks or fissures—a condition which it is very hard to attain in burning kieselguhr. The hardness of the mass should be well determined. The greatest possible hardness is desirable for the durability of the mass. On the other hand, the perfect cleansing of the filtering-surface requires a certain degree of softness of the mass. As a matter of fact a perfect cleansing can only be obtained when a very thin coat of the surface is rubbed off simultaneously with the impurities settled thereon. The pores of all filters made of burned clay, china-earth, natural sandstone, artificial stone, &c., become more and more clogged up when in use. After each cleansing, either by rubbing or washing off, some of the pores remain clogged, so that filters of this type continually decrease in their quantitative efficiency. If, however, the burned masses of kieselguhr should be too soft, the filter will be rapidly used up by the cleansing. For the practical use of such masses it is therefore of the greatest importance that the proper degree of hardness be obtained in the manufacture. In view of the mechanical preparation the material must also possess a certain degree of toughness, and the burned crusts which are formed on all articles of burned kieselguhr must be removed, such crusts being too dense and hard. All these requirements, which are essential for an effective and durable filtering mass, are provided for by the new composition of my present invention, which consists of the burned mixture of kieselguhr with asbestos or asbestic fibrous minerals—as, for instance, asbestine, amianthus, and the like, the essential component of which consists of the silicates of magnesia—to which mixture organic binding bodies or compounds may be added before the burning of the suitably-formed mass.

In carrying out my improved process I mix or combine the constituents of the described mass in any desired manner, suitably forming it in molds before burning, if desired. Then I burn it to the necessary extent, after which it is used as it comes from the burning, or it is subsequently bored, turned, or shaped, as circumstances dictate. The material so obtained can be burned without cracks, and it presents the most favorable conditions as to hardness and a fine and uniform porosity, so that three to four liters of water with a pressure of three atmospheres can be filtered in one minute through a filter of four hundred and fifty centimeters surface and one centimeter thickness, the filtrate being absolutely free of all solid matter.

The advantages of this new material over all other similar products are as follows:

A. As to the forming and burning: Pieces of uniform density can up to this time only be obtained by means of the pug-mill and die generally used in brickworks. The mass of kieselguhr and substances that may be mixed therewith shows the following characteristics during this treatment:

First. White and burned kieselguhr earth without any addition does not furnish cohesive pieces. An addition of about ten per cent. green earth—*i. e.*, kieselguhr of the lower strata, not weathered layers of deposits thereof, such as are found, for instance, near Unterluss in Hanover—gives a sufficient plasticity to the mass; but the pieces will crack during the burning, and the burned article is very soft.

Second. An addition of liquid adhesive organic substances (paste, dextrine, &c.) in such quantities that the pieces will issue whole from the die causes, in consequence of the pressure of the mold, the mass to become so dense that when burned it is very slightly porous and very hard, and an addition of solid organic binding compounds (wood-pulp, fiber of plants, &c.) to be destroyed in the burning would cause the burned substance to be very poorly held together, full of cracks, and of too-large pores. An addition of alkali or alkalic earth has little or no effect as to the plasticity; but it increases the tendency to crack during the burning and renders the mixture more solid.

By a great many experiments I have ascertained that none of the above-mentioned or other additions to the kieselguhr apparently suitable for this purpose will furnish a mass which, so far as the molding and burning are concerned, will produce equal or approximately equal results to an addition of asbestos or asbestic minerals, (either alone or, if a very porous material is desired, by the further addition of solid organic matter.) The fibrous structure of this addition gives tenacity to the moist mass, while the pulverized parts and the natural talc enable the formed piece to be easily forced through the die without great pressure. The burned article prepared of this mass is entirely free of cracks and the loss during the burning is practically zero.

B. From a physical standpoint: While solid organic additions (without the same the mass would be too dense) will produce large pores by burning out during the burning, the addition of asbestos which yields about ten to twelve per cent. of water of crystallization during the burning will cause a sufficient enlargement of the volume of the pores without forming coarse pores. No other known addition of one or more foreign substances presents approximately the same guaranty for a product free of cracks. As each addition of asbestos slightly increases the hardness and the burned article becomes chinalike when about fifty per cent. is added, it is obvious that the desired density may always be obtained: but it is not possible to give the exact proportion of asbestos, as the quantity of organic matter contained in the unburned earth is very variable and is from zero to twenty per cent. In each particular case the quantity of asbestos to be used should consequently be previously ascertained in order to secure the necessary porosity and hardness—i. e., such degree of hardness that with a wet sponge, loofah, (vegetable sponge,) &c., it will be possible slightly to rub off some of the material.

C. In the mechanical preparation: As all burned masses consisting, essentially, of kieselguhr are very fragile, there is a considerable loss when the articles so made are turned or bored. It is obvious that the fibers of the asbestos, which remain intact during the burning process, impart an increased tenacity to the article, and also in this respect the addition of asbestos has been shown to be a great advantage in the manufacture.

What I claim is—

1. A composition of matter for filtering purposes consisting of a burned mixture of kieselguhr and asbestic material.

2. A composition of matter for filtering purposes consisting of a burned mixture of kieselguhr and asbestic material, the ingredients being so proportioned that the composition is of such hardness as to permit the rubbing off of a portion of the material with a wet sponge or the like.

In witness whereof I have hereunto signed my name in the presence of two subscribing witnesses.

HERMANN NORDTMEYER.

Witnesses:
LEONORE KASCH,
F. S. BEYCE.